(12) United States Patent
Pournasseh et al.

(10) Patent No.: US 7,721,271 B2
(45) Date of Patent: May 18, 2010

(54) LANGUAGE LOCALIZATION AND INTERCEPTING DATA USING TRANSLATION TABLES

(75) Inventors: Houman Pournasseh, Bellevue, WA (US); Rerkboon Suwanasuk, Redmond, WA (US); Xiaofeng Zang, Redmond, WA (US); Bjorn C. Rettig, Redmond, WA (US); Hideki Ohyama, Sammamish, WA (US); Hongying Lian, Sammamish, WA (US); Yong Guo, Issaquah, WA (US); Jan Roelof Falkena, Seattle, WA (US); ZhongYuah Li, Redmond, WA (US); Mamatha Suresh, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1016 days.

(21) Appl. No.: 10/829,370

(22) Filed: Apr. 22, 2004

(65) Prior Publication Data
US 2005/0240905 A1  Oct. 27, 2005

(51) Int. Cl.
*G06F 9/45* (2006.01)
(52) U.S. Cl. ..................................... 717/137
(58) Field of Classification Search ................ 717/125, 717/127, 136–141
See application file for complete search history.

(56) References Cited

U.S. PATENT DOCUMENTS

| | | | | |
|---|---|---|---|---|
| 5,507,030 A * | 4/1996 | Sites | | 717/136 |
| 5,583,761 A | 12/1996 | Chou | | |
| 5,586,330 A * | 12/1996 | Knudsen et al. | | 717/136 |
| 5,909,578 A * | 6/1999 | Buzbee | | 717/130 |
| 6,092,036 A | 7/2000 | Hamann et al. | | |
| 6,334,101 B1 | 12/2001 | Hetherington et al. | | |
| 6,425,118 B1 * | 7/2002 | Molloy et al. | | 717/136 |
| 6,438,716 B1 | 8/2002 | Snover | | |
| 6,453,280 B1 | 9/2002 | Yang | | |
| 6,490,547 B1 | 12/2002 | Atkin et al. | | |
| 6,492,995 B1 | 12/2002 | Atkin et al. | | |
| 6,629,313 B1 * | 9/2003 | Rowe et al. | | 717/136 |
| 6,654,950 B1 * | 11/2003 | Barnishan | | 717/136 |
| 6,654,954 B1 | 11/2003 | Hicks | | |
| 6,684,388 B1 * | 1/2004 | Gupta et al. | | 717/136 |
| 6,760,905 B1 * | 7/2004 | Hostetter et al. | | 717/148 |
| 6,941,545 B1 * | 9/2005 | Reese et al. | | 717/130 |
| 7,219,336 B2 * | 5/2007 | Li et al. | | 717/136 |
| 2002/0165708 A1 | 11/2002 | Kumhyr | | |
| 2002/0198719 A1 | 12/2002 | Gergic et al. | | |
| 2004/0045013 A1 | 3/2004 | Lam | | |
| 2004/0056894 A1 | 3/2004 | Zaika et al. | | |

OTHER PUBLICATIONS

Trolltech AS, "Qt/Embedded—A Technical Overview", 2001, Trolltech, pp. 1-31.*
Python, "Python Library Reference—Release 2.0", Oct. 2000, BeOpen.com PythonLabs, pp. i-vi, 1-397.*
Daniel Brandon, "Localization of Web Content", CCSC: Southeastern Conference, pp. 345-358, Dec. 2001.
K. Scott et al., "Retargetable and Reconfigurable Software Dynamic Translation", IEEE, pp. 36-47, 2003.
Karen Kukich, "Techniques for Automatically Correcting Words in Text", ACM Computing Surveys, vol. 24, No. 4, Dec. 1992.
European Search Report, Application No. 05103166-2211, dated Nov. 3, 2005, 3 pages.

* cited by examiner

*Primary Examiner*—Ted T Vo
(74) *Attorney, Agent, or Firm*—Wolf, Greenfield & Sacks, P.C.

(57) ABSTRACT

A system for providing translations of applications for operation in a non-native language. The translation makes use of associated tables either existing within the operating system or at locations outside of the operating system. The translation system makes use of application based translations tables that may also interrelate with core translation tables and community translation tables, prior to sending the data to a graphical interface.

22 Claims, 14 Drawing Sheets

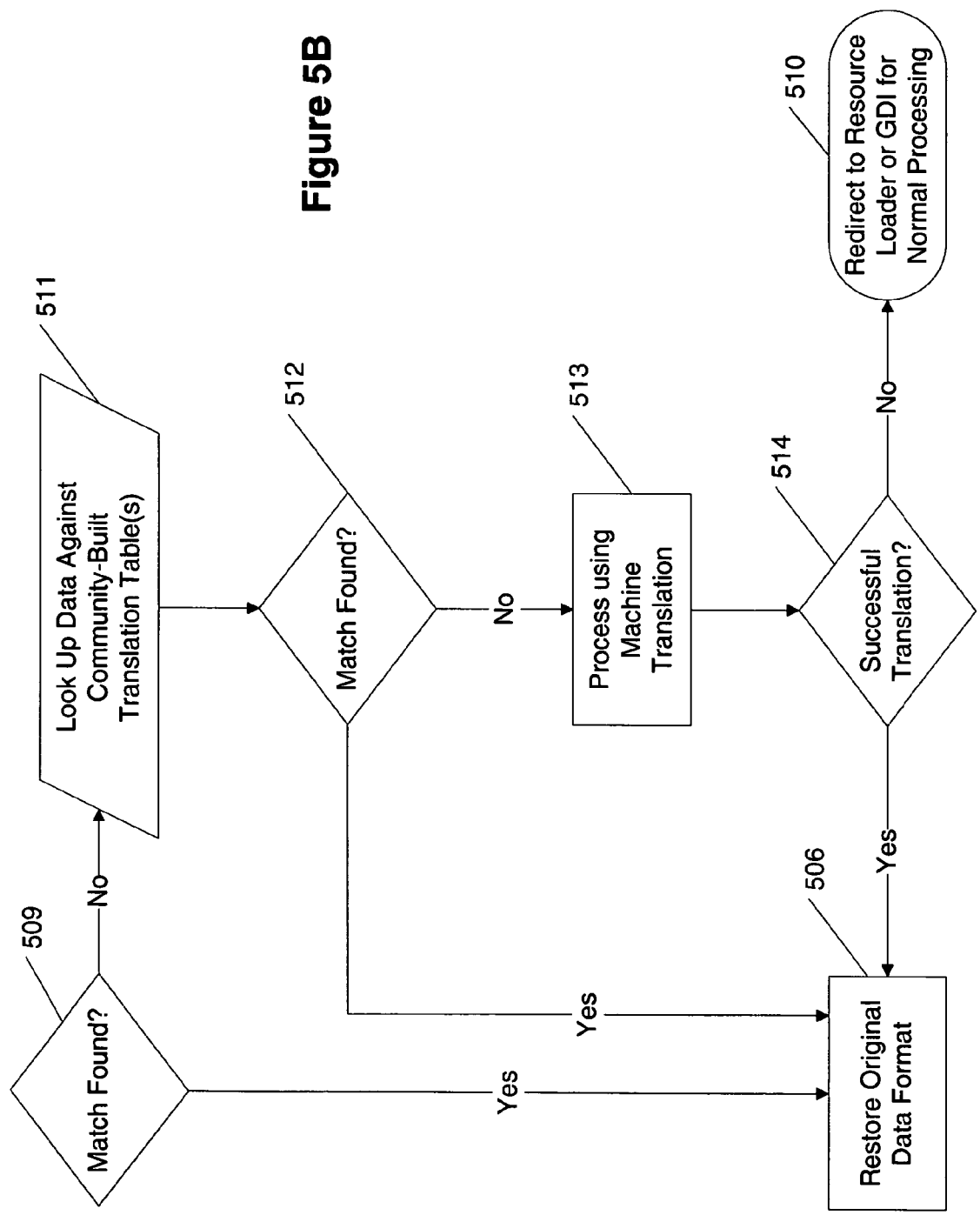

LANGUAGE LOCALIZATION AND INTERCEPTING DATA USING TRANSLATION TABLES

BACKGROUND OF THE INVENTION

1. Technical Field

Aspects of the present invention relate to software products. More particularly, aspects of the present invention relate to providing users with application content in a local language.

2. Description of Related Art

Computing systems exist in a number of languages. A number of software applications and operating systems are created in a first language then ported over to other languages. This is sometimes referred to as localization of the applications and operating systems. However, a number of software applications are never translated into other languages. These applications remain available only in their source language for a variety of reasons. Sometimes the high cost of localization is not expected to be met by sales of applications in other languages. Other times, the software developer may lack the skills needed to effectively translate or have translated the nuances of an application into other languages. These and other reasons bar users of different languages from using applications that have not been translated into their specific languages.

A conventional process of creating applications in more than one language is shown in FIG. 3A. An application is created in a first language in step 301. Next, a developer may translate the application into a second language in step 302. The conventional process of creating applications in more than one language is through the use of localization tools. Either resource files are localized and the product is re-compiled, or tools that do not require the re-compiling of the application are used.

Some techniques exist to allow applications to be more easily translated for users of other languages. First, some systems provide links to automated machine translation dictionaries that are accessed in real-time to translate text to be displayed to a user into that user's local language. Here, the automated machine translation dictionaries have no knowledge of terms as used in an application. The selected translation typically has nothing in common with previously translated words. A difficulty with this approach is that mere mechanical dictionary translations are of generally poor quality. File in a source language (relating to the act of accessing a location for a document) may be translated as a metal sharpening device using mere dictionary translations.

Second, as shown in FIG. 3B, an application 304 may include with it an application translation resources 305. The core of application 304 may be written in a first language. However, when text is to be output to a display or printer or other device or medium, the application 304 accesses the application translation text in application translation resources 305. The application 304 obtains corresponding entries in text of translation resources 305 relating to expected text messages and their translated equivalents. The translated equivalents are forwarded to graphic device interface (GDI) 308, rendered, and output to a display 309.

Three issues exist with the system of FIG. 3B. First, unless the application translation resources 305 are provided, no robust translation of the application 304 will exist. Second, some of the information provided by application 304 may be generated from the operating system, not application 304 directly. If the operating system supporting application 304 is localized to a first language and application 304 is localized to a second language, the user may be forced to receiving messages in both the first and second languages. Third, if an application exists already without translation resources 305, then potential users may not have the ability to use application 304 in their language until translation table 305 is created and integrated into application 304.

BRIEF SUMMARY

Aspects of the present invention address one or more of the issues mentioned above, thereby providing applications to users of different languages. Aspects of the invention include the use of operating system-level translation tables that may be used alone or in conjunction with other translation tables to provide translations of messages.

These and other aspects are addressed in relation to the Figures and related description.

BRIEF DESCRIPTION OF THE DRAWINGS

Various aspects of the present invention are illustrated in the attached figures.

FIGS. 5A and 5B show various processes for providing users with localized applications in accordance with aspects of the present invention.

DETAILED DESCRIPTION OF THE DRAWINGS

Aspects of the present invention relate to providing an ability to translate applications and operating systems. Through using an operating system-level translation table alone or in combination with other translations tables (including application-specific translation tables and community translation tables), applications may be able to be used in other languages.

The following is separated into various sections to assist the reader. These headings include: general-purpose computing environment; table-based localization; location of translation tables; operating system integration; and examples of translation table usage.

General-Purpose Computing Environment

Figure 1:
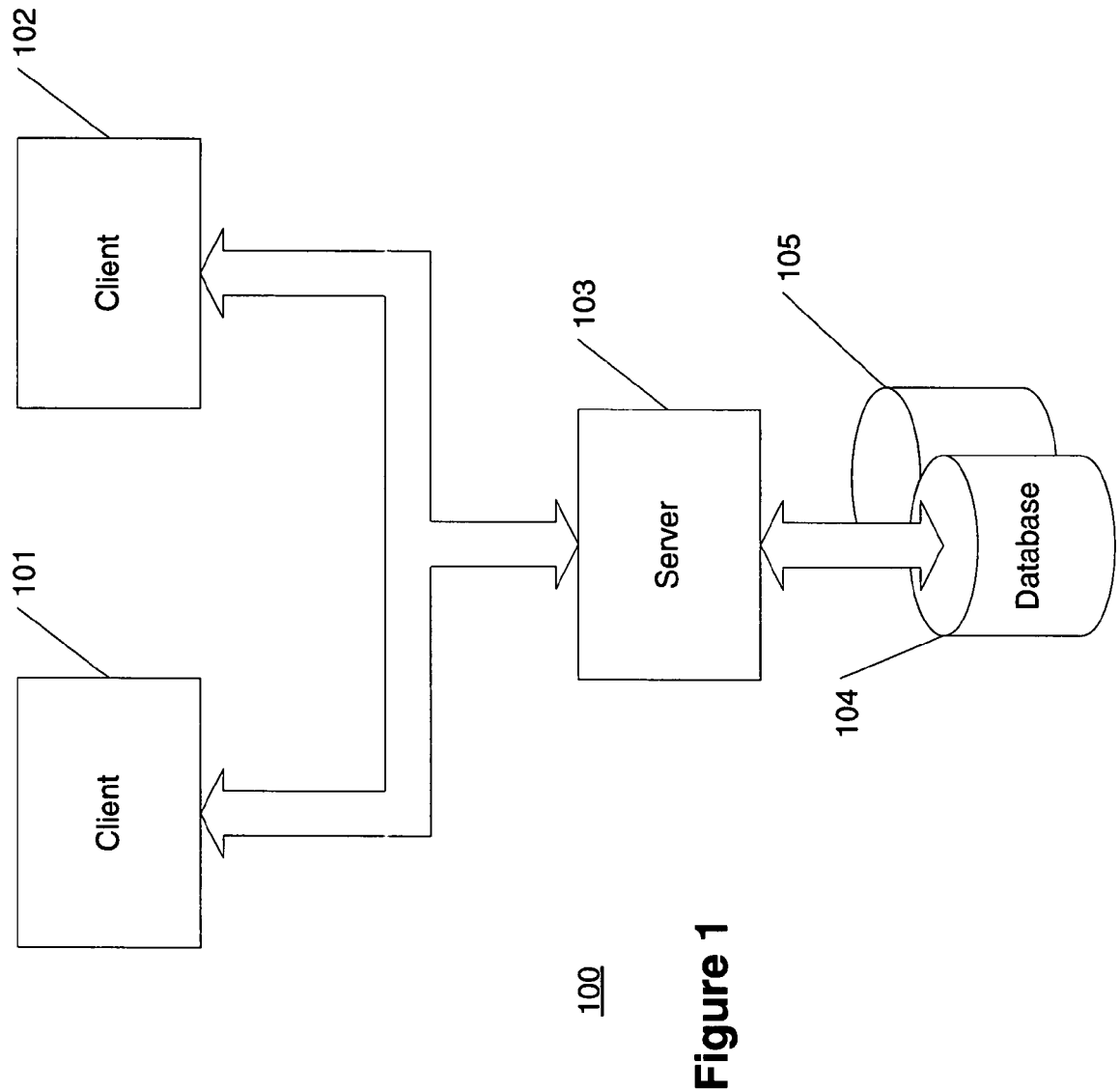
FIGS. 1 and 2 show general-purpose computing environments supporting one or more aspects of the present invention.
Figure 2:
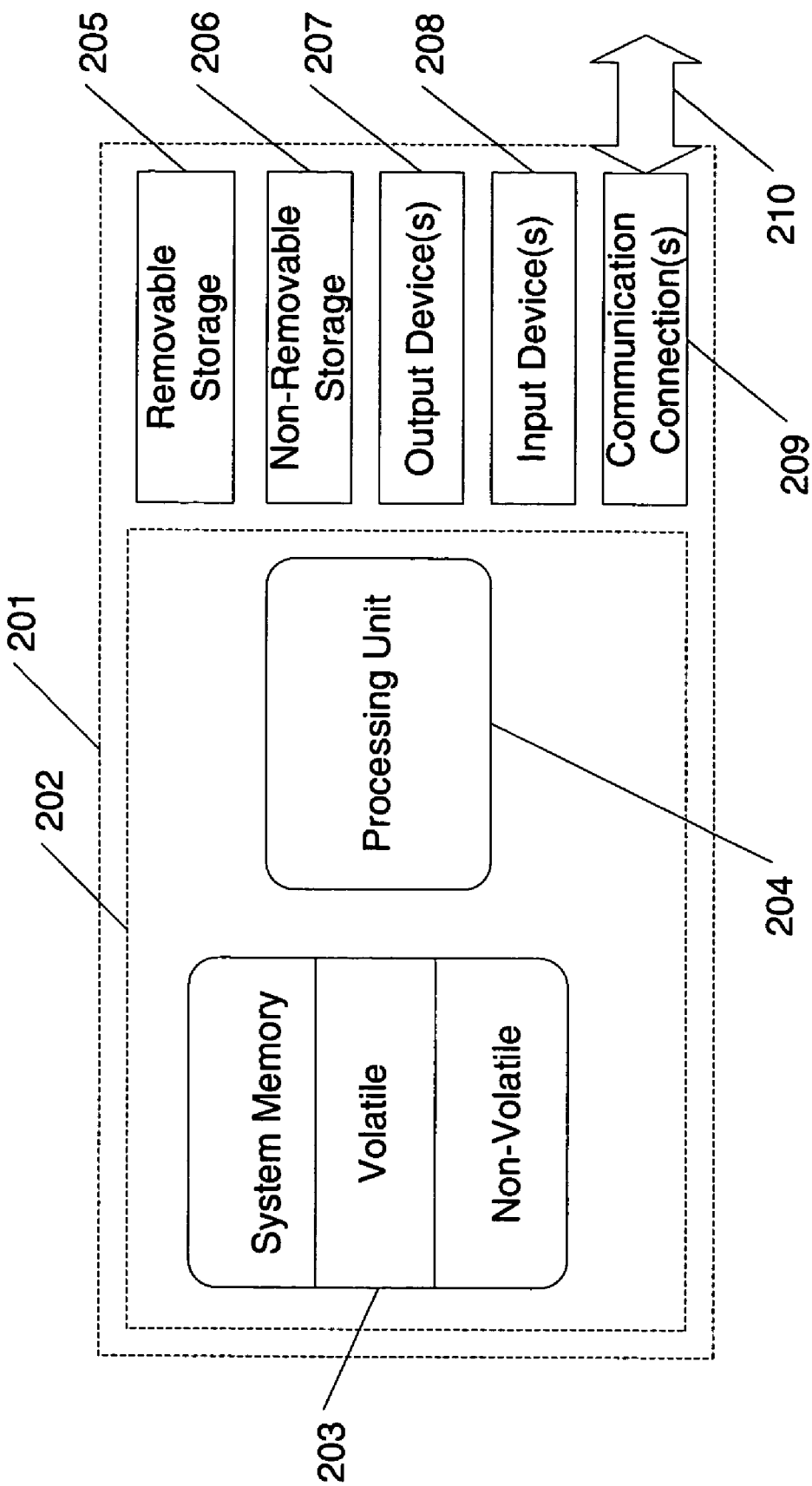
Figure 3A:
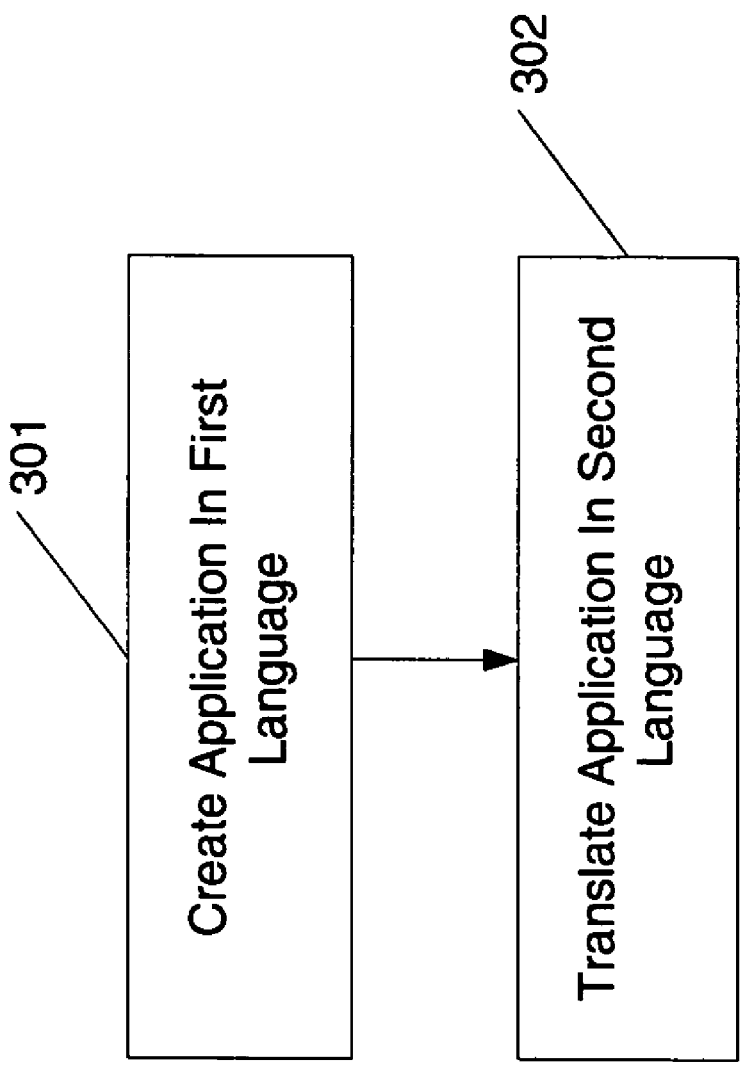
FIGS. 3A and 3B show conventional localization techniques for applications.
Figure 3B:
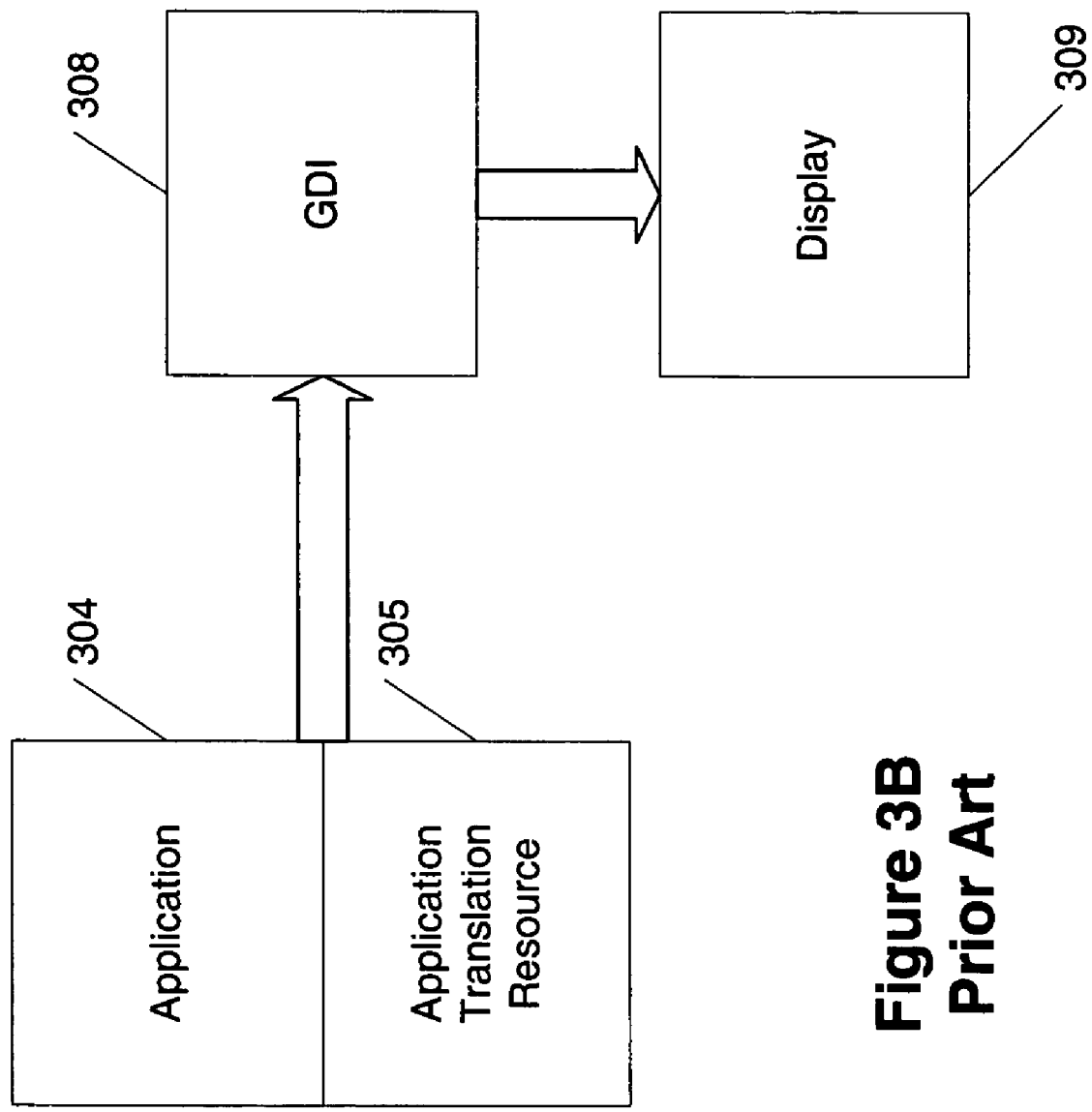

FIGS. 1 and 2 illustrate examples of suitable operating environments 100 and 201 in which the invention may be implemented. The operating environments 100 and 201 are only a few examples of suitable operating environments and are not intended to suggest any limitation as to the scope of use or functionality of the invention. Other well known computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

Aspects of the invention may be described in the general context of computer-executable instructions, such as program modules, executed by one or more computers or other devices. Generally, program modules include routines, algorithms, programs, objects, components, data structures, etc. that perform particular tasks or implement particular abstract data types. Typically, the functionality of the program modules may be combined or distributed as desired in various embodiments.

Computing device systems 100 and 201 typically include at least some form of computer readable media. Computer readable media can be any available media that can be accessed by server 103 or system 201. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by server 103 or system 201. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

With reference to FIG. 2, an illustrative system for implementing aspects of the invention includes a computing device, such as device 201. In its most basic configuration, device 201 typically includes a processing unit 204 and memory 203. Depending on the exact configuration and type of computing device, memory 203 may be volatile (such as RAM), non-volatile (such as ROM, flash memory, etc.) or some combination of the two. Additionally, device 201 may also have mass storage (removable and/or non-removable) such as magnetic or optical disks or tape 205-206. Similarly, device 201 may also have input devices such 208 (including a mouse, stylus, keyboard, trackball, and the like) and/or output devices 207 such as a display and the like. Other aspects of device 201 may include network connections 209 to other devices, computers, networks, servers, etc. using either wired or wireless media 210. All these devices are well know in the art and need not be discussed at length here.

Table-Based Localization

Applications may provide translations to users using aspects of the present invention. In some aspects of the present application, the operations of the present may be described as occurring at one or more levels: an application level and/or an operating system level.

The operating system may provide an engine that allows fast translations by comparing intercepted text destined for a system resource loader or GDI with a stored table of translated text. The stored table may have translations of each term individually and/or may include only strings of text. The strings may be the entire content or sentences displayed to a user in a menu/button/dialog box and the like. One advantage of having corresponding translations of strings of text is that the meaning of terms in the strings is maintained. This way the resulting translation will always correspond to the source text.

The engine may reside in the operating system or elsewhere. Where there is no translation table designated, the engine may pass on the intercepted system resource loader or GDI calls to their intended destinations. One advantage of placing the engine at the operating system level is that application developers may need to modify their code less if at all to provide translations of their applications. In some situations, the application developers may desire to use only the translation table accessed by the operating system. In other situations, the application developers may desire to provide additional or alternative translation tables in order to accomplish the following:
  a. To cover additional languages or dialects;
  b. Provide alternative translations for some terminologies; and
  c. Provide translations for application-specific terminology not addressed by the translation tables associated with the operating system.

Figure 4:
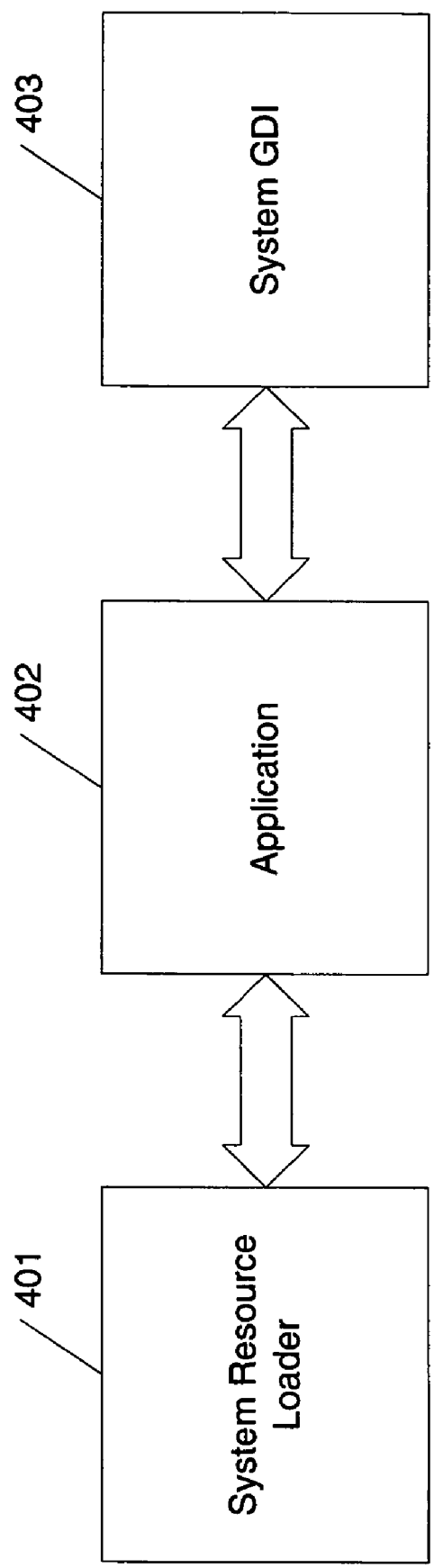
FIG. 4 shows interaction between an application, system resources, and a GDI.

FIG. 4 shows system resource loader 401 and system GDI 403 both exchanging information with application 402. The application 402's resource loading process is handled by the system resource loader module. Calls to resource loading application programming interfaces (for instance, a load resource API or a find resource—external or internal), which may be made directly by the application or indirectly by the system on behalf of the application are handled by the system resource loader 401 and the final result is returned to the application 402.

The redirecting engine allows the interception and eventual redirection of the content of the user interface's resource element data exchanges between the application 402, the system resource loader 401 and the system GDI 403.

The translation tables (including the operating system's translation tables(s) and the application(s) translation tables) take advantage of the engine's functionality to offer an alternative source of data containing UI elements in the desired target language. The operating system's translation table may include items from the generic operating system. It may or may not also include terminologies from popular applications. For simplicity, the operating system's translation table whether or not including terminologies from popular applications is referred to as a "core translation table". Application developers may supplement the operating system's translation table by including application specific translation tables.

The nature of the translation tables may be a unidirectional mapping from a single source language to a single target language. Alternatively, the translation tables may a bi-directional mapping between the source and target languages. Further, the translation tables may be mappings (unidirectional or bidirectional) between a single source language and multiple target languages. The specification of the target language helps determine which of the target languages to use.

Figure 5A:
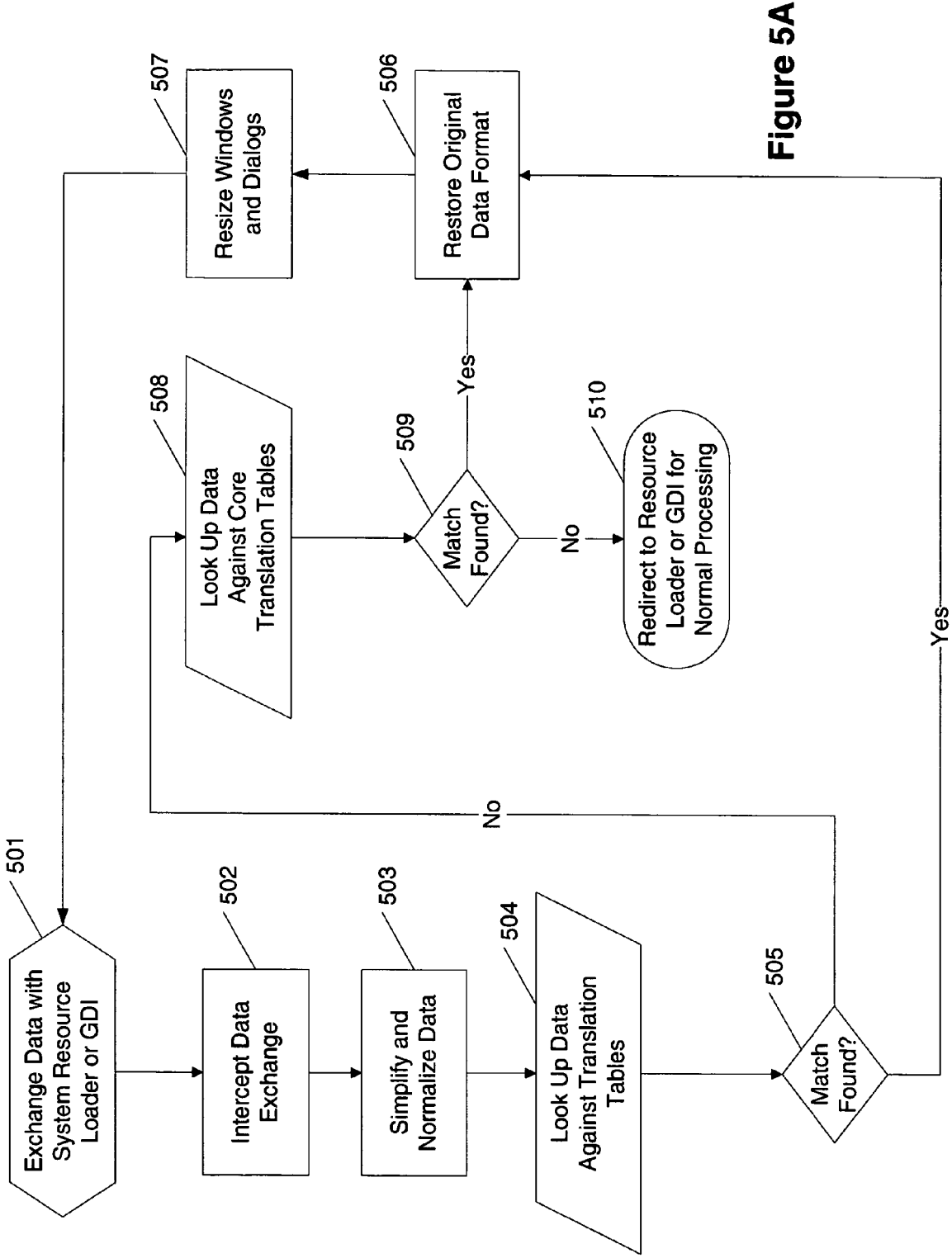

FIGS. 5A and 5B show the use of translation tables in accordance with aspects of the present invention. In FIG. 5A, an application begins to exchange data with system resource loader or GDI in step 501. The data from step 501 is intercepted by the engine in step 502. The data is simplified and normalized in step 503. In step 504, the data is looked up against an application's translation tables in the target language. If a match (step 505) exists between the data from step 503 and information in the translation tables 504, then the original format of the data is restored in step 506. The information so as to restore the original format may be stored future use. The windows and dialogs may be resized to accommodate the translated content in step 507. The process returns to the application in step 501.

If no match is found in step 505 (because of no match or no application translation table exists), then the system looks up the data against core translation tables in the target language in step 508. If a match is found in step 509, then the system performs step 506 and continues from there. If no match is found in step 509, then the application is redirected to the resource loader or GDI for normal processing.

FIG. 5B shows a modification to FIG. 5A in which a community translation table exists. If in step 509 no match was found, then the data is looked up against community built translation table(s) in step 511. If a match is found in step 512, then step 506 is executed and the process continues as in step 5A. If no match was found in step 512, then the process uses machine translation (for instance, real-time dictionary translation) 513. If the translation was successful in step 514, then the process returns to step 506 and continues. If no match was found in step 514, the process then redirects the data in step 510.

Figure 6:
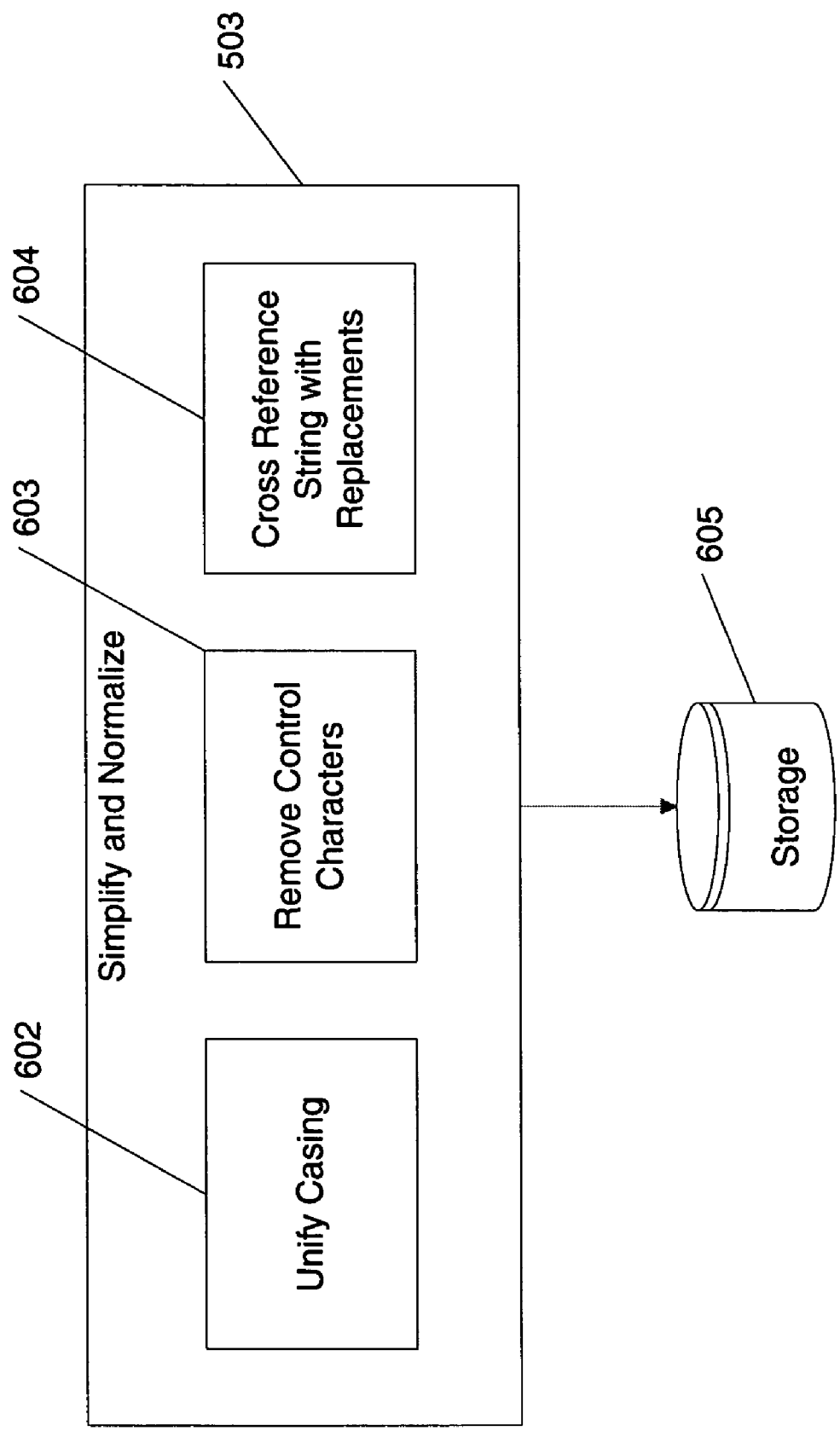
FIG. 6 shows various processes that may occur during normalization in accordance with aspects of the present invention.

Step 503 is shown in greater detail in FIG. 6. The simplification and normalization processes may include one or more of the following:

a. Unify casing (602)—change all case of data to upper or lower case;

b. Remove control characters (603)—for example, "& open . . . \tCrtl+O" may be replaced with "open";

c. Cross reference string with replacements (604)—String resources with replacement arguments may be cross referenced between resource loader data exchange and GDI of display.

The results, modifications, or description of modifications made to data in the simplify and normalize step 503 as shown in FIG. 6 may be stored in storage 605. For example, the modification from "Open" to "open" may be stored as any of "Open" and "open", "O" and "o", or some representation of the first character being changed to lower case. Similarly, the removal of the control characters and the cross referencing may be stored as well for future use.

Referring again to FIG. 5B, community-built translation tables in step 511 may be generated by entities to be used when the developer has not created an application translation table. Alternatively, communities may develop translation tables to supplement or augment existing translation tables. For instance, users may determine that provided translation tables are insufficient in some instances. The community may create a translation table for use with the application. A user may be able to designate the order in which the translation tables are used. In this example of a community creating a translation table, the user may designate the community translation table to be use prior to an application specific translation table then the core translation table.

Communities may provide the community-built translation tables, for instance, to address new translation of uncovered terminology or translation for new languages through a community effort via a community glossary. As described above, FIG. 5B is optional in that applications may be competently localized into another language using the process in FIG. 5A.

Machine translation 513 may or may not be an option. In some instances, machine translation dictionaries may not exist that bridge source and target languages.

Step 506 may include the restoration of hotkeys by using the source or target language. One benefit of using the source language to regenerate hotkeys is that associations in the application or operating system may remain.

The engine that intercepts the data exchange in step 502 may be embodied in a number of ways including as combination of a dynamic link library and a database. For example, the dynamic link library may be responsible for one or more of the following tasks:

a. Identification of approved/registered applications.

b. Interception of data exchange between the application and the system's resource loader and/or GDI.

c. Resource simplification: In order to improve the hit rate and maintain a small translation table size, the engine may perform the simplify and normalize step 503. Examples of step 503 may further including the removal of spaces, new lines, ellipses, colons, semicolons, accelerators, etc. from a string. Also, instead of "&Open . . . \ tCtrl+O", a string may be modified to "Open" or "open".

d. Auto-resizing: automatically adjusts the size of dialog boxes and windows of the target application in order to prevent text and control cutoff introduced by translation. The resizing may be done at run time by adding a vertical and horizontal padding to window measurements. For that, a percentage increase value, a font face name, and a font size may be defined for each one of the languages. The values may be hard coded or modifiable. An example of default values may include:

i. Size increase: 30%.

ii. Font face name: Microsoft Sans Serif.

iii. Font size: 8.

If using the Microsoft Windows® operating system, a registry key may be created, for example under HKEY_CURRENT_USER\Software\MAT\ to store one or more of the following values:

a. The specification of a source language in which the user wants to launch the application;

b. The specification of a target language in which the user wants to launch the application;

c. Resizing: the percentage of the auto resizing for a given application;

d. Font size: the actual font size to be used for an application; and e. An application resource lookup for use with FIGS. 5A and 5B.

For other implementations, different storage locations may be used.

In some cases, for instance with non-Unicode applications, a matching system locale may be needed to properly display the user interface elements in the language desired by the user. In these cases, if the target language is not handled by the currently set system locale, the system may attempt to simulate the matching system locale. These processes may occur in the background to a user when a list of target applications is predefined and non-Unicode applications are identified.

The database component of the engine may include a file that includes the list of applications and also tags non-Unicode applications.

Figure 12:
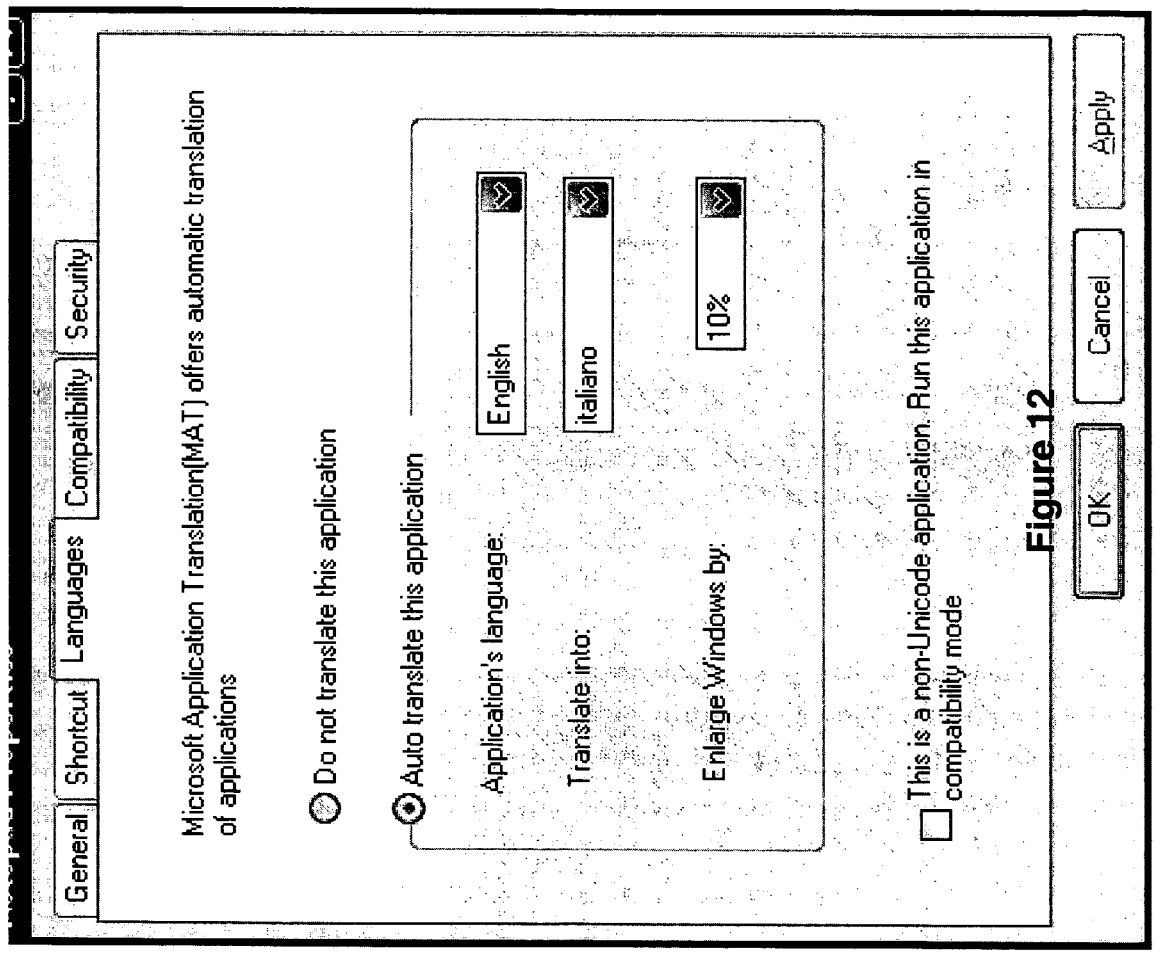
FIG. 12 shows a user interface in accordance with aspects of the present invention.

The system may provide a user interface to a user to modify how data to be translated is addressed. FIG. 12 shows a user interface that provides these options including whether or not an application should be translated, the source and destination languages, and the size by which to enlarge windows. Further, the process by default may launch approved applications in the same language as the running operating system.

Here, end users can decide either not to localize the target language or to launch the application in an alternative language. Also, as above, the resizing value for windows and dialog boxes to compensate for text size increase induced by translation. A further editor may be provided to developers that allow them to extract their application's UI elements and provide new/alternative translation for them. The editor allows the developer to create a translation table binary file to be shipped along their application.

Location of Translation Tables

Figure 7:
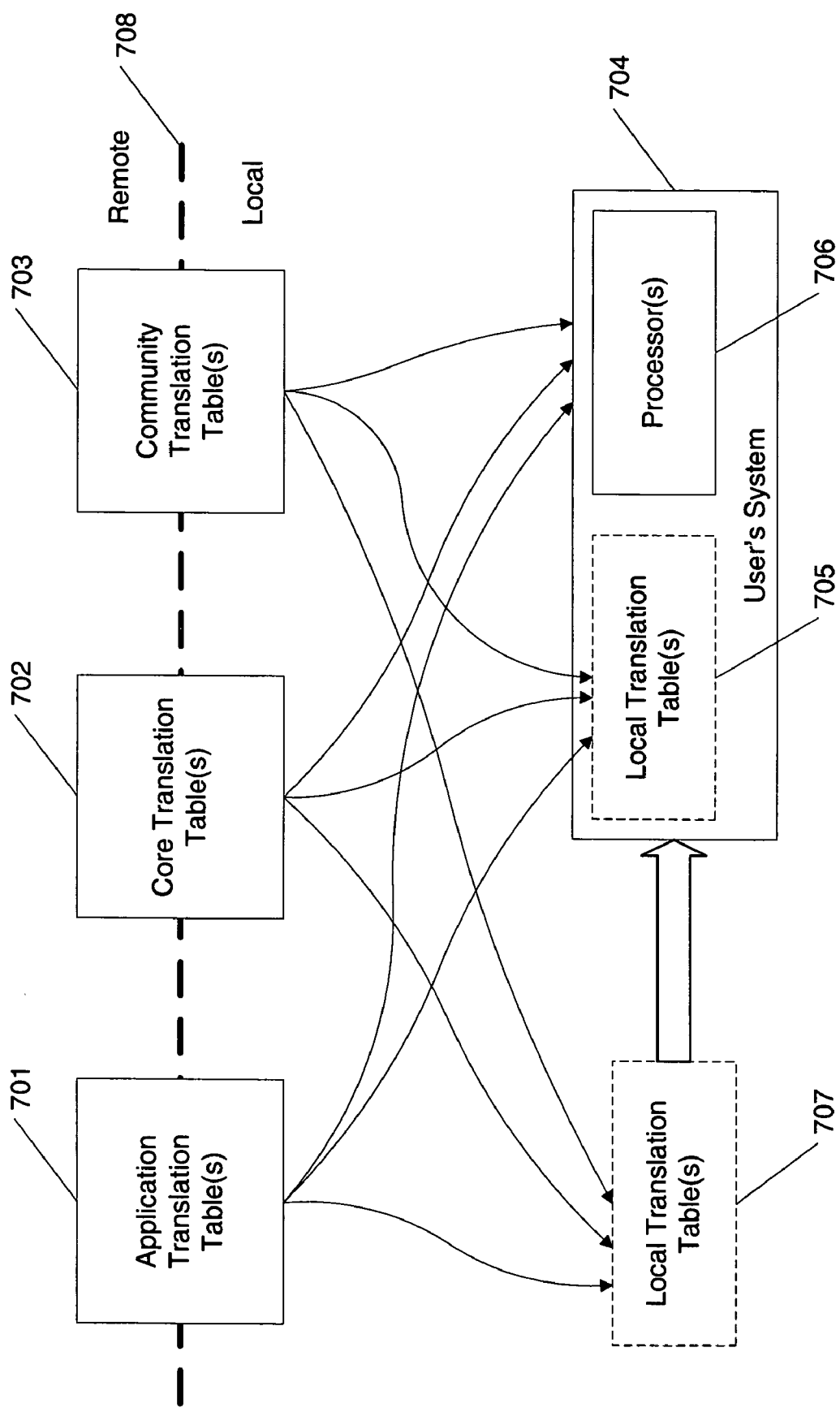
FIG. 7 shows various tables and their relationship to a user's system in accordance with aspects of the present invention.

The location of translation tables may vary. FIG. 7 shows various examples of where the translation tables may be located. Application translation table(s) 701, core translation table(s) 702, and community translation table(s) 703 may be located locally or remotely as shown my dividing line 708. Remotely may include over the internet or other remote location.

The user's system 704 with processor 706 may use the translation tables 701-703 in a variety of ways. First, the user's system may access the translation tables directly and use them while running an application (as shown by the arrows between the translation tables 701-703 and system 704. Second, the translation tables may be installed locally in system 704 as 705 and accessed directly. Third, the translation tables may be placed at a local location as represented by local translation table(s) 707. These three approaches may be used in varying combinations.

Operating System Integration

Figure 8:
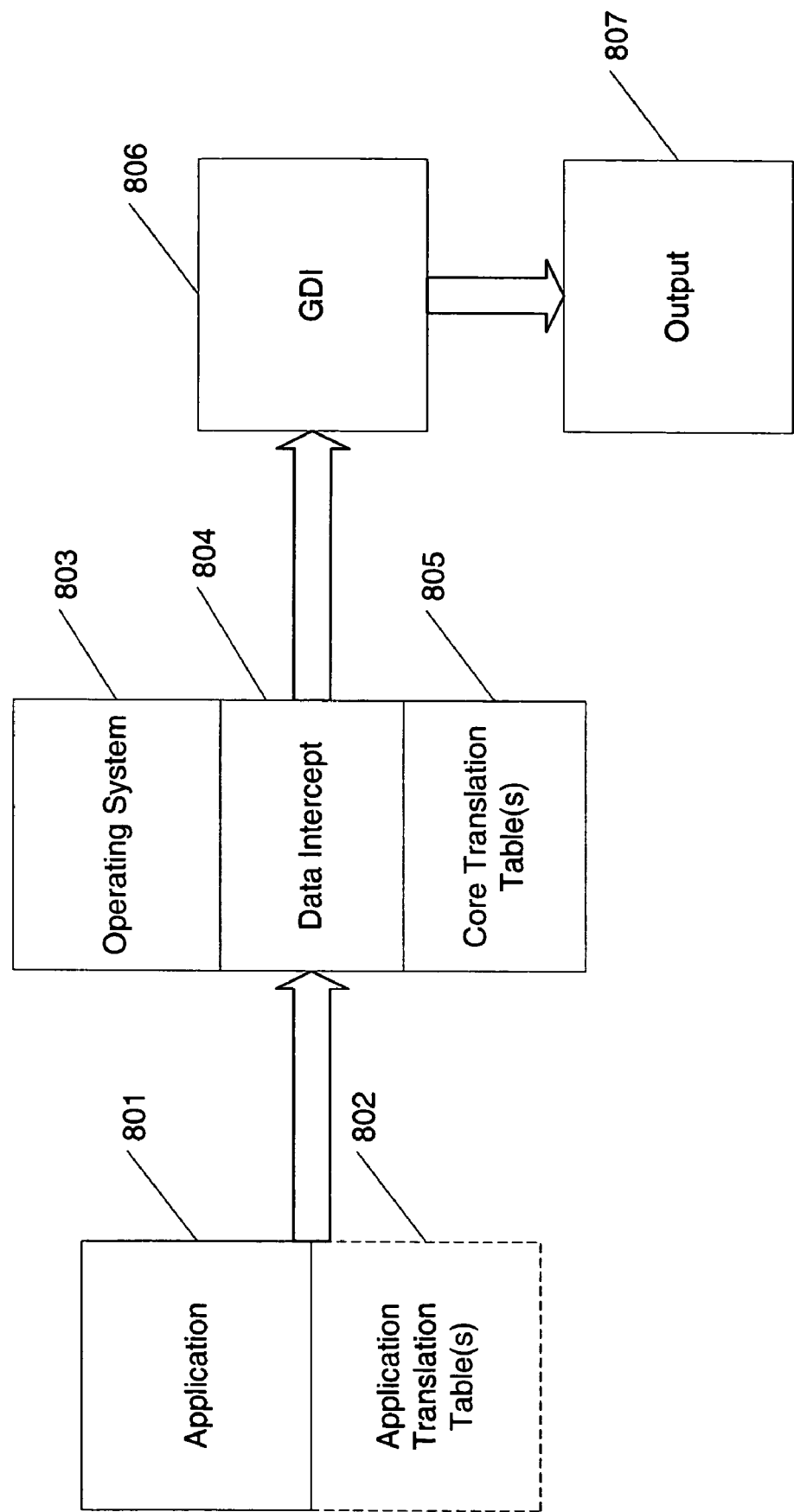
FIG. 8 shows the interaction of various tables in accordance with aspects of the present invention.

FIG. 8 shows how the engine of the operating system helps provide translations. Application 801 with or without application translation table(s) 802 sends information downstream. The information is intercepted by data intercept engine 804 that runs as part of operating system 803. The data intercept engine 804 works with the data from application 801 by using core translation table(s) 805 and sends the translated information downstream to GDI 806 (or system resource loader, not shown). The resulting translated information may be sent to output 807 (for instance, a display, printer, printer driver, and the like).

Examples of Translation Table Usage

Figure 9:
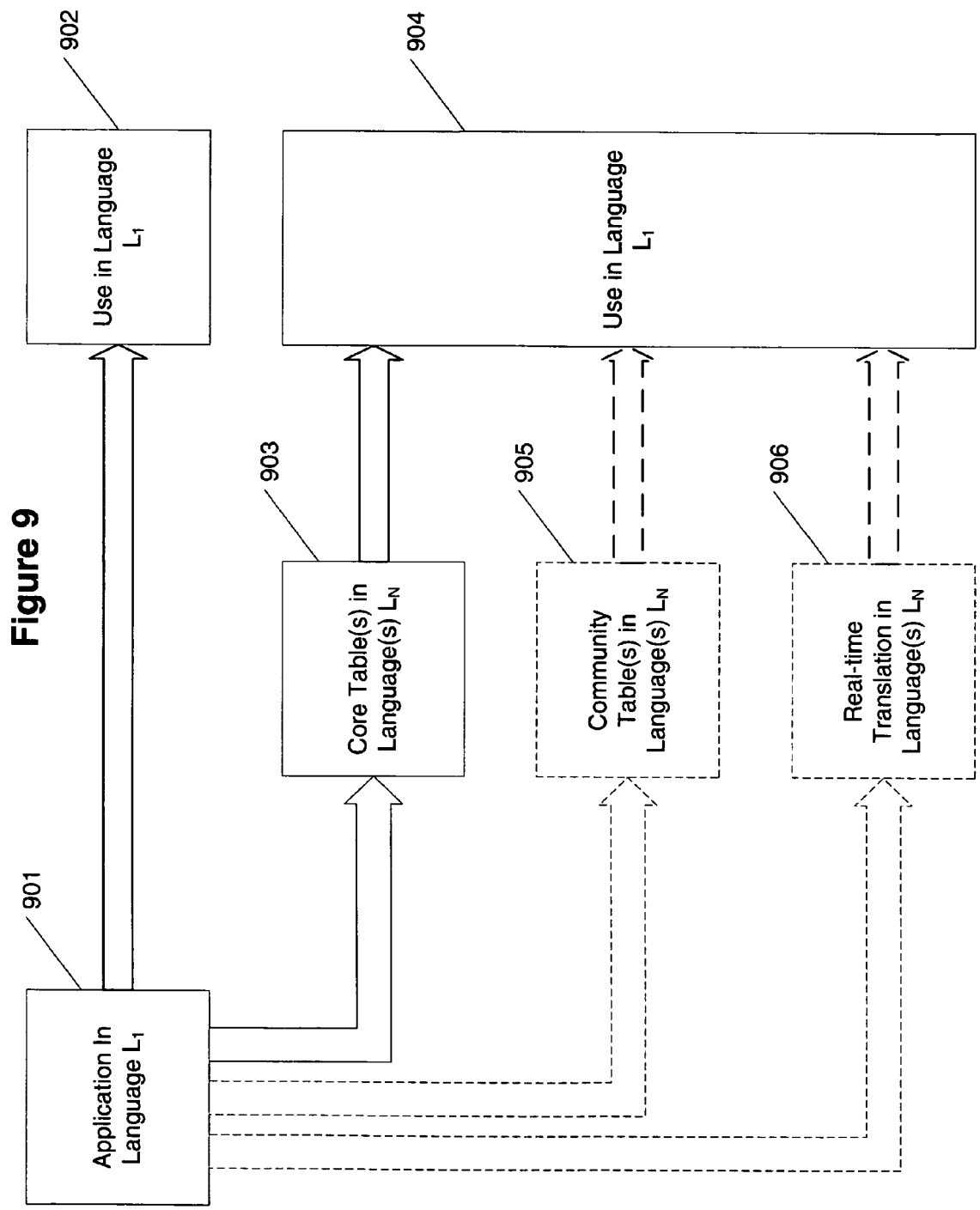
FIGS. 9 through 11 show the output of an application being translated using one or more tables in accordance with aspects of the present invention.
Figure 10:
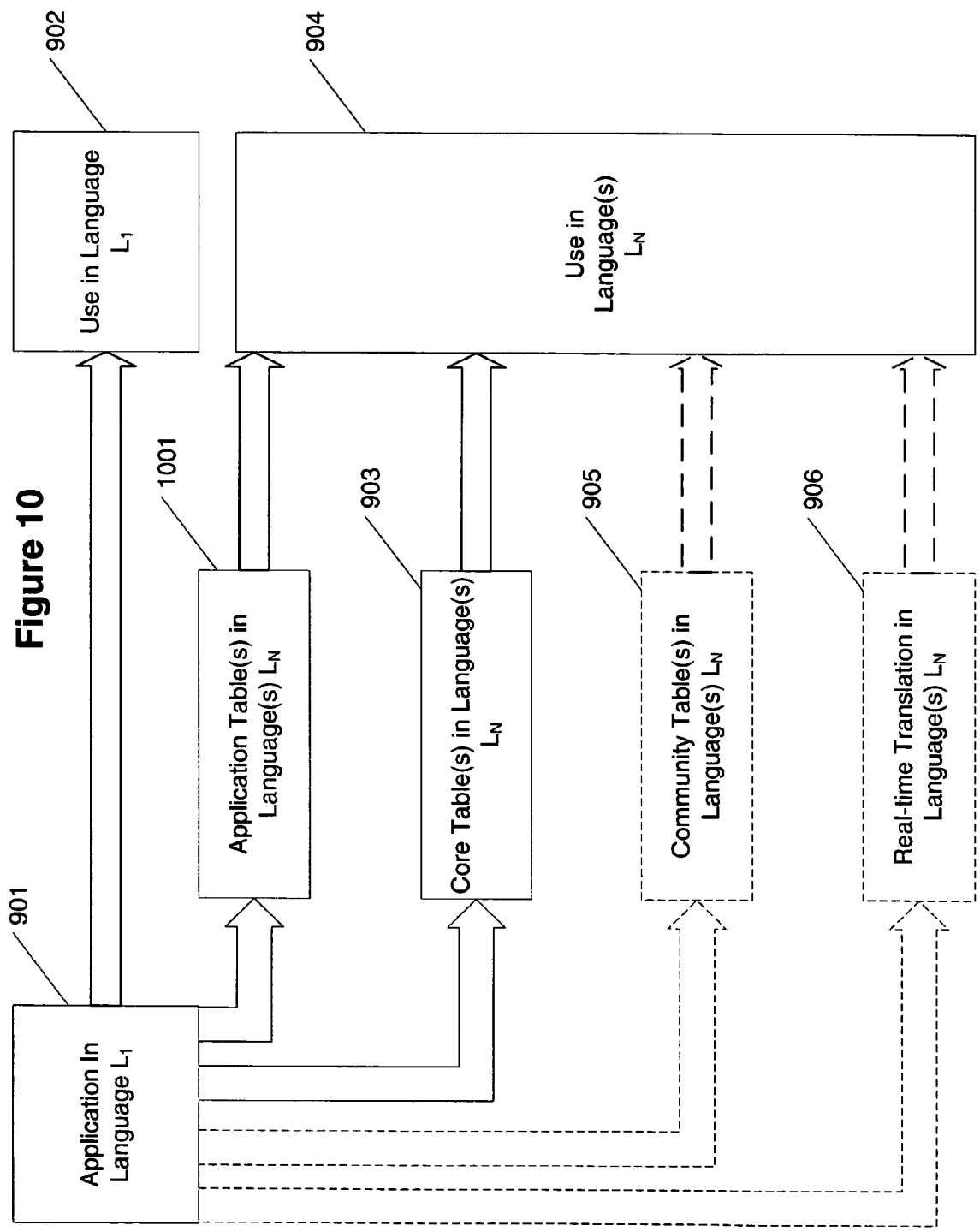
Figure 11:
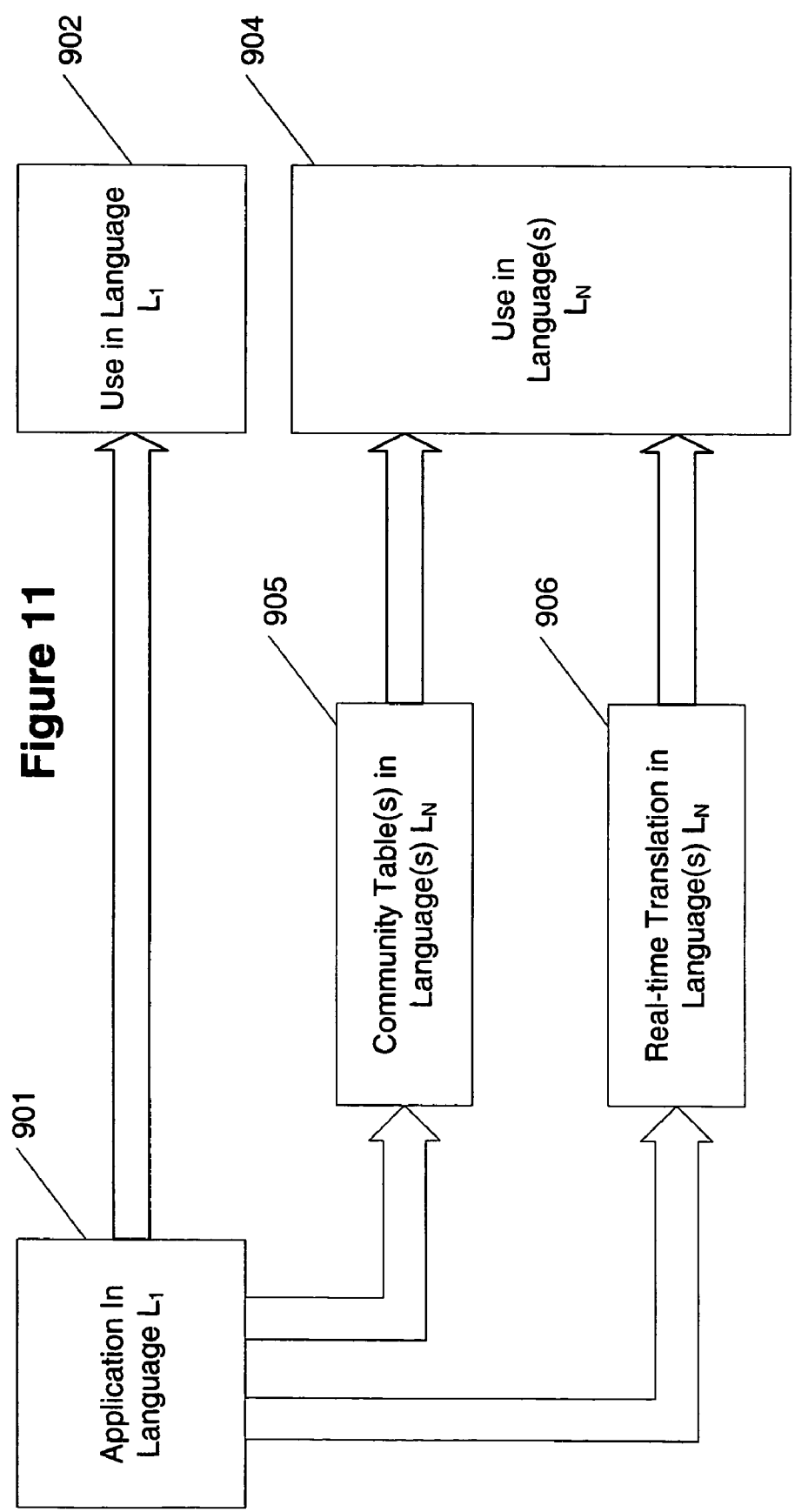

FIGS. 9-11 shows various examples of applications being translated. In FIG. 9, an application in language $L_1$ 901 may be used (902) in language $L_1$. Also, it may be translated using core translation table(s) 903 into language $L_N$ 904. Community table(s) 905 and real-time translation 906 may be used as well.

In FIG. 10, application translation table(s) 1001 is added to the example of FIG. 9.

In FIG. 11, the system only uses the community table(s) 905 and real-time translation 906 to translate the application 901.

Aspects of the present invention have been described in terms of illustrative embodiments thereof. Numerous other embodiments, modifications and variations within the scope and spirit of the appended claims will occur to persons of ordinary skill in the art from a review of this disclosure.

We claim:

1. A process for operating a computer system comprising an application program executing on an operating system, the operating system maintaining a core translation table, the process being for modifying information from a source language to a target language and comprising the steps of:

with the application program, performing an interaction with the operating system during which source data in a source language is exchanged with one of a system resource loader or a Graphic Data Interface;

within the operating system, intercepting the source data during the interaction;

determining if a match exists between the intercepted source data and data in the source language in a translation table of a plurality of translation tables;

when a match exists, selecting target data in a target language from a translation table of the plurality of translation tables having matching data, the plurality of translation tables having an hierarchy and the selecting comprising selecting the target data from the table with matching data highest in the hierarchy, and the plurality of translation tables comprising an application translation table provided in conjunction with the application and a core translation table provided in conjunction with the operating system, with the application translation table being higher in the hierarchy than the core translation table, whereby the core translation table is bypassed when the source data matches data in the application translation table;

completing the interaction with the operating system using the target data replacing the source data when a match is found based on said determining step, and when no match is found based on said determining step, completing the interaction with the operating system without substituting data from a translation table of the plurality of translation tables for the source data; and displaying the information upon a display device based on the completed interaction.

2. The process according to claim 1, wherein the plurality of translation tables further comprises a community translation table.

3. The process according to claim 1, further comprising the step of:

simplifying and normalizing said intercepted data.

4. The process according to claim 3, wherein said simplifying and normalizing step further comprising the step of:

unifying a case of said intercepted data.

5. The process according to claim 3, wherein said simplifying and normalizing step further comprising the step of:

removing control characters.

6. The process according to claim 3, wherein said simplifying and normalizing step further comprising the step of:

cross referencing said intercepted data between resource loader and Graphic Data Interface.

7. The process according to claim 1, further comprising the step of:

restoring translated data into a format of said intercepted data.

8. The process according to claim 1, further comprising the step of:

resizing a displayed item to show said translated data.

9. The process according to claim 1, wherein:

the plurality of translation tables comprises a community-built translation table; and selecting the target data comprises selecting data from said community-built translation table.

10. The process according to claim 1, wherein completing the interaction with the operating system without substituting data from a translation table of the plurality of translation tables for the source data comprises:
processing said intercepted data using machine translation to generate target data; and
completing the interaction with the operating system using the target data replacing the source data.

11. A system for modifying information from a source language to a target language comprising:
means for providing an interface, supported by a computing device, to a user to modify how data to be translated is addressed;
means for selecting a source language and a target language based upon input provided by the user though the interface;
means for intercepting data exchanged in the source language between an application program and one of a system resource or Graphic Data Interface;
a plurality of means for translating the plurality of means for translating comprising at least one translation table, the plurality of means for translating having an hierarchy; and
means for replacing said intercepted data with target data obtained from the highest priority means for translating having a translation for the intercepted data when any of said means for translating provides target data, and when none of the means for translating has a translation for the intercepted data, processing and displaying the source information upon a display without translation.

12. The system according to claim 11:
the plurality of means for translating comprises an application translation table.

13. The system according to claim 11; further comprising:
means for simplifying and normalizing said intercepted data.

14. The system according to claim 13, wherein said means for simplifying and normalizing further comprising:
means for unifying a case of said intercepted data.

15. The system according to claim 13, wherein said means for simplifying and normalizing further comprising:
means for removing control characters.

16. The system according to claim 13, wherein said means for simplifying and normalizing further comprising:
means for cross referencing said intercepted data between said resource loader and said Graphic Data Interface.

17. The system according to claim 11, further comprising:
means for restoring translated data into a format of said intercepted data.

18. The system according to claim 11, further comprising:
means for receiving through the interface user input indicating a scale factor; and
means for resizing a displayed item based on the scale factor to show said translated data.

19. The system according to claim 11, wherein:
the plurality of means for translating comprises a community-built translation table.

20. The system according to claim 11, further comprising:
means for processing said intercepted data using machine translation.

21. A system for providing translations comprising:
a processor running an operating system, said operating system being associated with at least one core translation table, said processor:
providing an interface, supported by a computing device, to a user to modify how data to be translated is addressed;
selecting a source language and a target language based upon user input provided through the interface;
selecting a translation table based on input from the user and at least one application-specific constraint;
with an application program, performing an interaction with the operating system during which source data in a source language is exchanged with one of a system resource or a Graphic Data Interface;
intercepting the source data during the interaction;
for a plurality of translation tables, determining if a match exists between the intercepted source data and data in a translation table of the plurality of translation tables; and
when a match exists, selecting target data in a target language from a translation table of the plurality of translation tables having matching data, the plurality of translation tables having an hierarchy and the selecting comprising selecting the target data from the table with matching data highest in the hierarchy, and the plurality of translation tables comprising an application translation table provided in conjunction with the application and a core translation table provided in conjunction with the operating system, with the application translation table being higher in the hierarchy than the core translation table, whereby the core translation table is bypassed when the source data matches data in the application translation table; and
an output device that outputs said selected target data as translated data in place of the source data when target data is selected, and when no target data is selected, the source data is displayed.

22. The system according to claim 21, further comprising:
a storage that stores said at least one core translation table, said storage being accessed by said processor to obtain said translated data.

* * * * *